(12) United States Patent
Hagstrom

(10) Patent No.: US 11,794,484 B2
(45) Date of Patent: Oct. 24, 2023

(54) INK MAINTENANCE SYSTEM FOR A PRINTER

(71) Applicant: Primera Technology, Inc., Plymouth, MN (US)

(72) Inventor: Erick Hagstrom, Wayzata, MN (US)

(73) Assignee: Primera Technology, Inc., Plymouth, MN (US)

( * ) Notice: Subject to any disclaimer, the term of this patent is extended or adjusted under 35 U.S.C. 154(b) by 0 days.

(21) Appl. No.: 17/742,673

(22) Filed: May 12, 2022

(65) Prior Publication Data

US 2022/0266597 A1    Aug. 25, 2022

Related U.S. Application Data

(62) Division of application No. 17/004,886, filed on Aug. 27, 2020, now Pat. No. 11,390,090.

(Continued)

(51) Int. Cl.
   *B41J 2/165*    (2006.01)
   *B41J 29/17*    (2006.01)
   (Continued)

(52) U.S. Cl.
   CPC .......... *B41J 2/17563* (2013.01); *A21D 13/24* (2017.01); *A21D 13/80* (2017.01); *A23P 20/18* (2016.08);
   (Continued)

(58) Field of Classification Search
   CPC ................. B41J 2/16523; B41J 2/1721; B41J 2002/1742; B41J 29/17
   See application file for complete search history.

(56) References Cited

U.S. PATENT DOCUMENTS

| | | |
|---|---|---|
| 4,981,074 A | 1/1991 | Machita et al. |
| 5,505,775 A | 4/1996 | Kitos |

(Continued)

FOREIGN PATENT DOCUMENTS

| | | |
|---|---|---|
| CN | 1868754 A | 11/2006 |
| CN | 201325212 Y | * 10/2009 |

(Continued)

OTHER PUBLICATIONS

Lin, Machine TranslationofCN-209919426-U, 2020 (Year: 2020).*

(Continued)

*Primary Examiner* — Scott A Richmond
(74) *Attorney, Agent, or Firm* — Westman, Champlin & Koehler, P.A.; Z. Peter Sawicki; Amanda M. Prose

(57) ABSTRACT

An ink maintenance system for a printer comprising a first tray having a base and a plurality of side walls, the first tray having a first length and an open top along the length and a second tray having a base and a plurality of side walls, the second tray having a second length and an open top along its length. The system also includes a fan and a filter. To use the system, a print head is positioned in a standby or cleaning position within the printer and ink is ejected from one or more print nozzles into an ink maintenance system within the printer such that the ejected ink is collected in at least one of a catch tray or a filter of the ink maintenance system. The system is then removable from the printer for cleaning.

11 Claims, 6 Drawing Sheets

Related U.S. Application Data

(60) Provisional application No. 62/894,323, filed on Aug. 30, 2019.

(51) Int. Cl.

| | | |
|---|---|---|
| *B41J 2/175* | (2006.01) | |
| *B41J 2/17* | (2006.01) | |
| *A23P 20/18* | (2016.01) | |
| *B41J 3/407* | (2006.01) | |
| *B41J 29/02* | (2006.01) | |
| *A23P 20/20* | (2016.01) | |
| *B41J 13/00* | (2006.01) | |
| *B41M 5/00* | (2006.01) | |
| *A21D 13/80* | (2017.01) | |
| *A21D 13/24* | (2017.01) | |
| *B29C 64/00* | (2017.01) | |
| *A23P 20/25* | (2016.01) | |

(52) U.S. Cl.
CPC .............. *A23P 20/20* (2016.08); *B29C 64/00* (2017.08); *B41J 2/1714* (2013.01); *B41J 2/1721* (2013.01); *B41J 3/407* (2013.01); *B41J 3/4073* (2013.01); *B41J 3/40731* (2020.08); *B41J 13/0009* (2013.01); *B41J 29/02* (2013.01); *B41J 29/17* (2013.01); *B41M 5/0041* (2013.01); *B41M 5/0047* (2013.01); *A23P 2020/253* (2016.08)

(56) References Cited

U.S. PATENT DOCUMENTS

| | | | |
|---|---|---|---|
| 5,795,395 A | 8/1998 | Ben-Matitayhu et al. | |
| 5,988,787 A | 11/1999 | Watanabe et al. | |
| 6,464,328 B1 | 10/2002 | Hiramatsu et al. | |
| 2004/0100521 A1* | 5/2004 | Rotering | B41J 2/16508 347/36 |
| 2004/0114192 A1 | 6/2004 | Jensen | |
| 2006/0119628 A1 | 6/2006 | Kofman et al. | |
| 2008/0180484 A1 | 7/2008 | Kulpa | |
| 2009/0021548 A1 | 1/2009 | Suzuki et al. | |
| 2011/0025735 A1 | 2/2011 | Nohilly et al. | |
| 2012/0141636 A1 | 6/2012 | Ackley, Jr. et al. | |
| 2015/0266309 A1* | 9/2015 | Nakata | B41J 2/1714 347/34 |

FOREIGN PATENT DOCUMENTS

| | | |
|---|---|---|
| CN | 201325212 Y | 10/2009 |
| CN | 105346266 A | 2/2016 |
| CN | 207128411 U | 3/2018 |
| CN | 209919426 U * | 1/2020 |
| EP | 2921311 A1 | 9/2015 |
| JP | 5346728 A | 12/1993 |
| JP | 2005327918 A | 11/2005 |
| JP | 2007136729 A | 6/2007 |
| JP | 2013078894 A | 5/2013 |
| KR | 20040027323 A | 4/2004 |
| RU | 2224955 C2 | 2/2004 |
| WO | 1997/027759 A1 | 8/1997 |
| WO | 1999013707 A1 | 3/1999 |
| WO | 2001/029748 A1 | 4/2001 |

OTHER PUBLICATIONS

Wensheng, MachineTranslationofCN-201325212-Y, 2013 (Year: 2013).*
Wensheng, MachineTranslationofCN-201325212-Y, 2009 (Year: 2009).*
European Search Report issued for EP 221587686, dated Jul. 26, 2022.
International Search Report issued for PCT/US2020/048406, dated Nov. 26, 2020.
Written Opinion of the International Searching Authority issued for PCT/US2020/048406, dated Nov. 26, 2020.
International Search Report issued for PCT/US2020/048404, dated Nov. 19, 2020.
Written Opinion of the International Searching Authority issued for PCT/US2020/048404, dated Nov. 19, 2020.
International Search Report issued for PCT/US2020/048407, dated Nov. 19, 2020.
Written Opinion of the International Searching Authority issued for PCT/US2020/048407, dated Nov. 19, 2020.

* cited by examiner

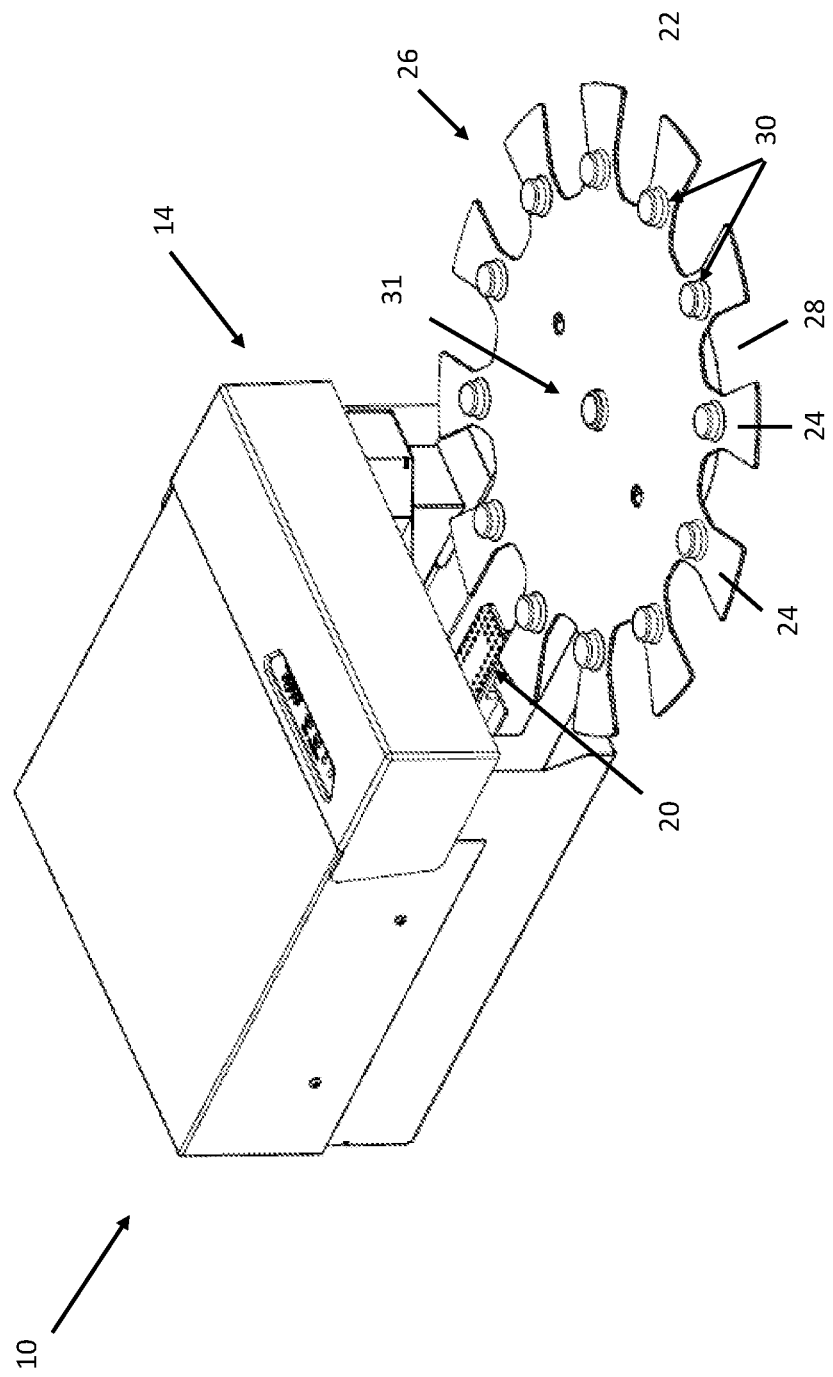

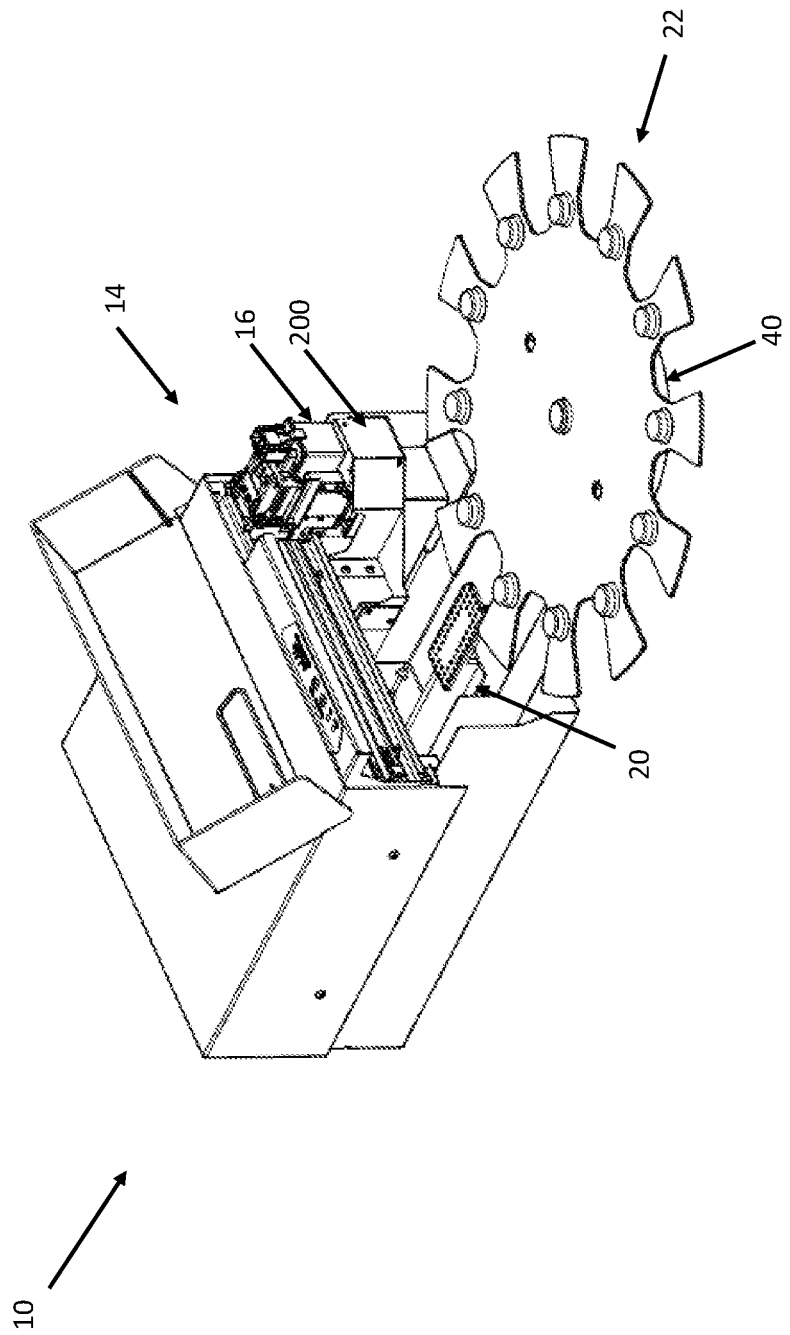

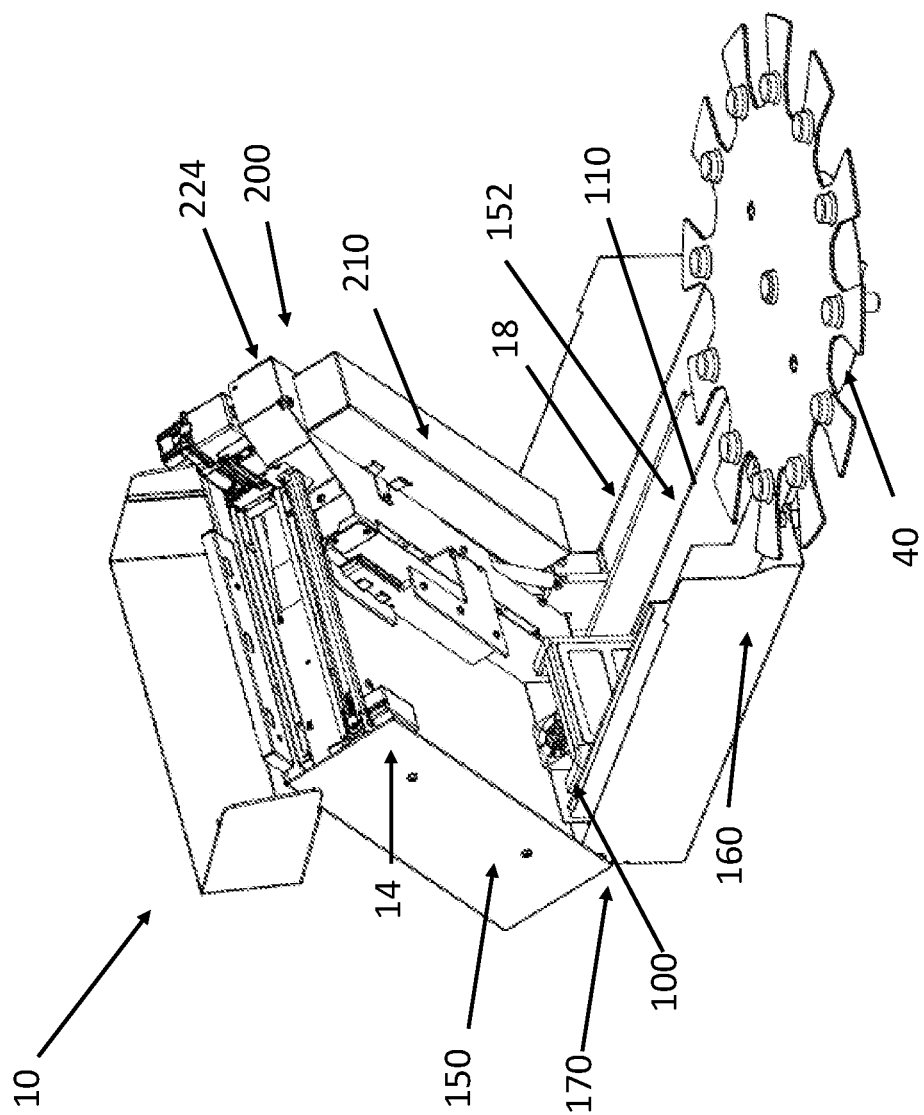

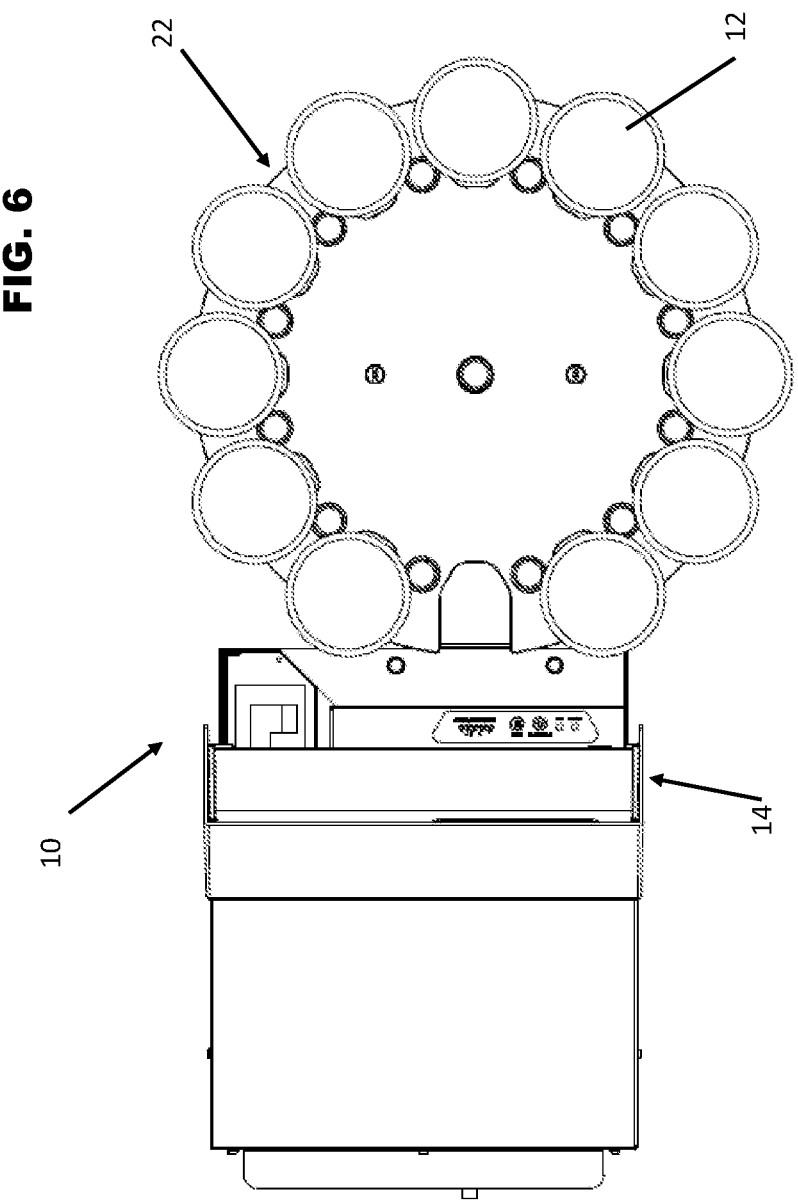

INK MAINTENANCE SYSTEM FOR A PRINTER

CROSS-REFERENCE TO RELATED APPLICATION

The present application is a Divisional of and claims priority to U.S. patent application Ser. No. 17/004,886, filed Aug. 27, 2020, which claims priority to and the benefit of U.S. provisional application Ser. No. 62/894,323, filed on Aug. 30, 2019, the contents of which are hereby incorporated in their entirety.

BACKGROUND

Printing with edible ink on food products is done for purposes of identifying, marking, decorating or personalizing the food product. For example, food products such as cookies can be passed under a print head ejecting edible ink on the top surface of the cookie, whether iced or plain, can be printed with a selected design.

Currently, a conveyor belt system or tray is used where one or more cookies are spaced apart in an array on the conveyor belt or tray and passed below the print head of the printer. Alternatively, labels comprised of edible paper can be printed with edible ink and applied to a food item with an edible adhesive such as frosting or icing.

Systems of the prior art that are able to print images on an array of food products supported on a conveyor belt or a tray with two or more columns of food products requires a larger and more expensive printer on the scale of a commercial printer. Such systems also usually require sophisticated sensing systems to locate the position of each food item for printing.

SUMMARY

An aspect of the present disclosure relates to an ink maintenance system for a printer. The system has a first tray having a base and a plurality of side walls, the first tray having a first length and an open top along the length. The system further includes a fan and a filter. The system catches ink from a printer when removably installed within a printer and does so according to NSF standards for food safety without the use of a foam material, such as a foam based filter. Thus, there is no foam within the first tray.

The first tray is a catch tray for catching ink droplets from one or more nozzles operably connected to an ink cartridge.

The fan is coupled to a second tray. The second tray has a plurality of side walls, the second tray having a second length and an open top and an at least substantially open bottom along its length. The filter is also positioned within the second tray.

The second tray is positioned on top of the first tray and covering at least a portion of the length of the open top of the first tray.

The second tray houses the filter and the fan and wherein the second tray at least partially covers the open top of the first tray. The first tray and second tray are removably coupled to one another to form an assembly for positioning within a printer.

The filter is removable from the second tray for cleaning or replacement of the filter.

The first tray and filter are cleanable for reuse and wherein the first tray and second tray are constructed from aluminum, stainless steel or combinations thereof.

Another aspect of the present disclosure relates to a removeable ink maintenance system for a printer comprising a first tray having a base and a plurality of side walls, the first tray having a first length and an open top along the length wherein the first tray is removable from a printer system, cleanable for re-use or a combination thereof; a fan; and a filter, wherein the filter is removable from the ink maintenance system, is cleanable for re-use or a combination thereof.

The ink maintenance system is incorporated into a printer system for printing on a surface of a plurality of food products. The incorporated system includes a printer having a print head and configured to receive an ink cartridge and a receiving arm supported by the printer and extendable and retractable across a path of a print head of the printer to sequentially deliver one of the plurality of food products to a position below the print head for printing. The system may further comprise a delivery tray spaced apart from the printer, and configured to deliver each one of the plurality of food products to the receiving arm for printing thereon. An ink cartridge maintenance system comprising an ink catch tray, a filter and a fan wherein the ink cartridge maintenance system is removably positioned within the printer.

The ink cartridge maintenance system is positioned adjacent a standby position of the print head within the printer.

The ink cartridge maintenance system comprises a filter holder for supporting the filter therein and wherein the fan is coupled to the filter holder.

The first tray is removable from the printer for cleaning.

Another aspect of the present disclosure relates to a method of cleaning print nozzles in a printer. The nozzles are cleaned by positioning a print head of the printer in a standby or cleaning position within the printer; ejecting ink from one or more print nozzles into an ink maintenance system within the printer such that the ejected ink is collected in at least one of a catch tray or a filter of the ink maintenance system; removing the ink maintenance system from the printer for cleaning of at least one of the catch tray or the filter. The system is then replaceable into the printer for subsequent use.

When cleaning the ink maintenance system, the system can be further cleaned by separating the catch tray and filter from one another and removing the filter from a filter holder.

Yet another aspect of the present disclosure relates to a printing system for printing images or content with edible ink on a surface of an edible food product. The edible food product printer of the present disclosure allows a user to print edible ink directly on food products at both low and higher volumes of food products. The ink maintenance system described herein can be incorporated therein.

BRIEF DESCRIPTION OF THE DRAWINGS

FIG. 3 is a perspective view of a printer system for the ink maintenance system.

FIG. 4 is a perspective view of the printer system with a cover portion open.

FIG. 5 is a perspective view of a hinged printer system in an open position with the cover portion also open.

FIG. 6 is a top view of the printer system for printing on food products.

DETAILED DESCRIPTION

Figure 1:
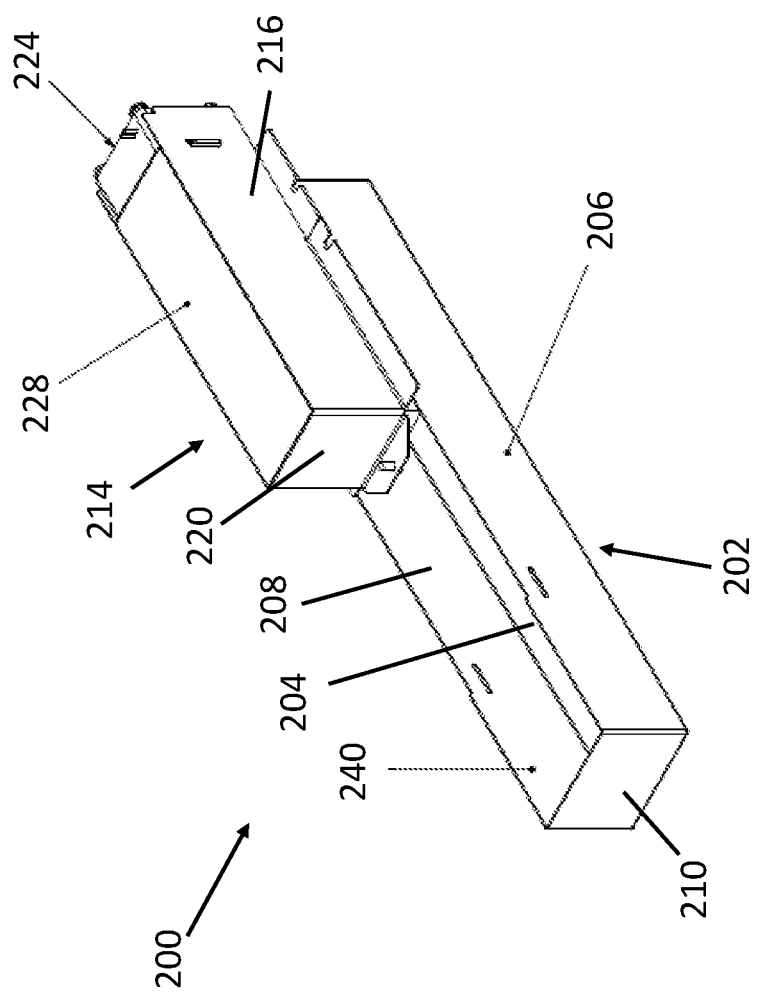
FIG. 1 is a perspective view of an ink maintenance system.

An ink maintenance system for a printer such as an ink jet printer is an assembly that is removable from the printer and can be disassembled for purposes of easy cleaning and/or replacement of individual components of the maintenance system, such as a filter, as needed.

During printhead maintenance, ink is fired from all the nozzles of the printhead to keep the nozzles clear for preserving the ink cartridge when nozzles are not in use. All of this expelled ink must be captured so it does not soil areas of the printer that must remain clean yet are areas that are difficult to clean. The maintenance system comprises a removable tub and a filter that can be easily removed from the tub, manually and thus without the use of tools.

The removable tub is a tray that is removable from the printer and catches the actual ink droplets without a foam material in the tub. The filter is provided in a second, separate tray and the filter is removable from its tray for cleaning. This arrangement allows the system to catch the ink without using a foam material for catching the ink. Instead, foam may be incorporated into the filter portion of this system but is not used in the tub for catching ink. The system described herein is NSF certified. Foam in the tub would be saturated when wet, allowing bacterial growth. Thus, the removable waste ink system described herein is washable to further prevent bacterial growth in the system.

The ink maintenance system described herein can be incorporated into any type of ink-based printing system. However, by way of non-limiting example, one embodiment described herein incorporates the ink maintenance system into a food product printing system.

A food product printing system of the present disclosure includes a printer system for printing an image on a surface of the food product. The print surface may be an actual surface of the food product itself. The printer system comprises a printer having a receiving arm and a delivery tray supported on a base. The system may also be provided with a plurality of different delivery trays, each tray configured for continuous delivery of a varied number of food products, and/or for food products of different or specific dimensions.

The receiving arm is configured for receiving a food product from the delivery tray and moving the food product from the delivery tray into the printer and into a printing position. The printing position is substantially below a print head of the printer such that the surface to be printed on is in the path of the print head. Once the food product is printed, the receiving arm then returns the printed food product to the delivery tray. The delivery tray is also configured to move in one or more directions in order to continuously and automatically deliver a plurality of food items sequentially to the receiving arm.

In one embodiment, the food product printer system is hingedly openable for access to the print area and thus access to an ink maintenance tray. A hinged connection is provided between an upper printer body and a support base of the printer system. The print area for the food products is within a space or cavity formed between the upper print body and the support base. For example, the support base has dimensions that provide a height to the print area and the cavity therearound within the printer system. The upper printer body supports many of the operational components of the printer system such as a print head and the gantry along which the print head is moveable, supports ink tank installations, and one or more of control and power components to the printer system. However, the support base may also comprise one or more power or control components for the printer system. One or more hinges or hinged-like connection systems are provided along one perimeter edge in the back of the printer system to operably connect the upper print body to the support base such that the printer is openable from a front area for access to the components supported by either the upper print body or the support base and for access to the print area and any components therein including removable elements such as the ink maintenance system and tray.

Figure 2:
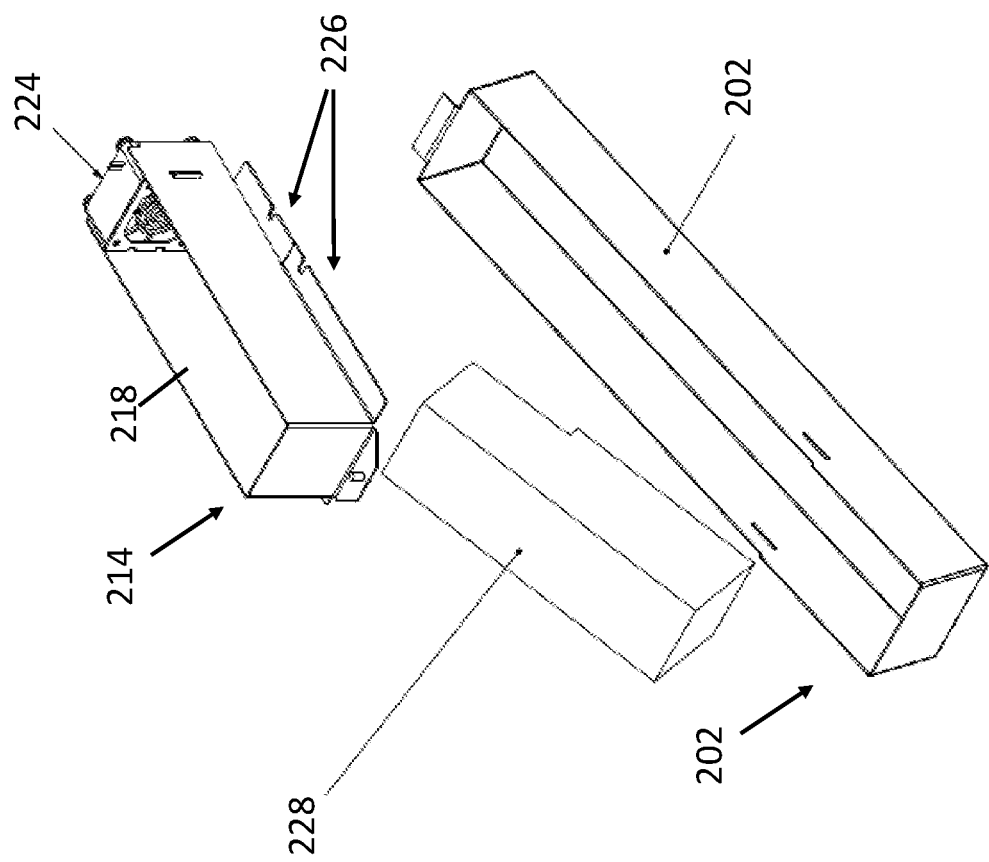
FIG. 2 is an exploded perspective view of the ink maintenance system.

An ink maintenance system 200 of one or more embodiments described herein can be positioned near the print head storage 16 or standby position of any printer system type so that ink cartridge and print nozzle cleaning and maintenance can be carried out between printing procedures. The ink maintenance system 200 is illustrated generally in FIGS. 1-2 and is incorporated into a printer system in one embodiment in FIGS. 3-6.

The ink maintenance system 200 comprises a catch tray or tub 202 and a channel 204 which couples to the catch tray 202. For example, the catch tray 202 is rectangular in shape having a floor 204 and side walls 206 and 208 with end walls 210 and 212. The catch tray 202 has an open top and an interior cavity for collecting ink droplets. An open area 240 of the catch tray 202 is configured for receiving the ejected ink during maintenance. Thus, the ink generally collects in the tray 202 for subsequent cleaning of the tray 202 and removal from the system, as described in further detail below.

The channel 214 is also rectangular in shape and having a length that is shorter than the catch tray 202 but a width that substantially matches the width of the catch tray 202. The channel 214 has side walls 218 and 220 with at least one end wall 222 and an open top with an interior cavity, where at least a portion of the base or bottom of the channel 214 is open for allowing air flow from the tray 202 through a filter 224 held therein. The channel 214 also supports a fan 224 therein or otherwise coupled thereto. The fan 224 may be positioned on one end of the channel 214 and thus provide a second end wall of sorts. While the embodiment illustrated herein includes a rectangular shaped catch tray 202 and corresponding channel 214, other shapes and dimensions are contemplated and within the scope of this disclosure as vary to fit into different size, style and type printer systems. The channel 214 also comprises tabs or other elements 226 outside of the channel 214 extending from an open or substantially open bottom which may comprise a mesh or slotted opening and serving as mechanisms for coupling the channel 214 on top of and thus covering at least a portion of the open top of the catch tray 202. These tabs or other elements 226 may also be used for removably securing the system 200 and/or the channel 214 in a printer system for secure use.

An interior of the channel 214 is sized to act as a filter holder and thus is configured to hold a filter 228 in combination with the fan 224 which directs air flow from the catch tray 202 to the filter 228. Thus, ink ejected into the catch tray 202 that is airborne or otherwise not collected on a surface of the catch tray 202 is pulling into the filter 228 and thus prevented from entering the printer system. Thus, the system 200 has components that cooperate for catching and cleaning ink from one or more nozzles of a print head of a printer. The fan 224 aids in directing air flow and controlling the direction of any ink mist generated such that ink mist is caught by the filter 228 and/or in or on the interior surfaces of the catch tray 202. The filter 228 is removable from the channel 214 for subsequent cleaning and/or replacement and the catch tray 202 and channel 214 are removable from the printer system and separable from one another for cleaning of the interiors of both the tray 202 and the channel 214. The ink maintenance system allows for removal of ink from the nozzles of a print head to maintain the integrity of the print nozzles and ink cartridges and to prevent ink from depositing on other areas of the printer.

The catch tray 202 and the channel 214 may be comprised of metal such as aluminum or stainless steel, although additional materials able to withstand the environment within a printer and being easily cleanable via wiping and/or washing such as various hard plastics can be used. The material of the tray 202 and channel 214 should be durable and lightweight.

One embodiment of the printing system 10 is illustrated generally in FIGS. 3-6. The printing system 10 is configured to receive a food product 12 from a delivery tray 22, to print on a surface of the food product 12 and return the food product 12 to the delivery tray 22. The system is also configured to do so automatically and continuously for a pre-determined number of food items. The system 10 comprises a printer 14 having a print head 16 and nozzles (not shown) wherein the print head 16 and nozzles are configured for printing with edible ink. The printer 14 also supports an extendable and retractable receiving arm 20.

The receiving arm 20 is operably connected to a power source within the printer 14. The receiving arm 20 is extendable and retractable with respect to the position of the path of the print head 16. The receiving arm 20 has a first end and a second opposing end and a substantially flat receiving surface extending therebetween. The first end is operably connected to a mechanism for retracting and extending the arm 20. The second end and at least a portion of the receiving surface of the receiving arm 20 are configured for extending outwardly from the printer 14. When extended, the receiving arm 20 may receive a food product, hold a food product, and/or return a printed food product to the delivery tray 22. The receiving arm also holds or supports the food product within the printer 14 and during printing on the surface of the food product 12.

With respect to the printer 14, the print head 16 moves linearly back and forth along a gantry in the manner of a standard inkjet printer for ejecting (edible) ink towards the print surface and thus printing pre-selected content on a print surface positioned below the path of the print head 16. The printer 14 is in communication with a controller wherein software may be used to control printing of the content on one or a plurality of food products. In such an embodiment, the ink maintenance system 200 would be positioned along a side of the printer system 10 extending along the depth of the printer system 10. The ink maintenance system 200 may be positioned along a side of the printer system 10 near the standby location of the print head 16 such that the print head 16 carrying the nozzles and ink can be cleaned and maintained at a location spaced apart from the print area 18 of the printer and between printing operations.

In further detail, the receiving arm 20 moves in a direction perpendicular to the print head path such that the receiving arm 20 extends and retracts across or through the path of the print head 16. In one embodiment, the receiving arm 20 is a substantially flat, rectangular support plate which extends towards a holder 26 of the delivery tray 22 in order to engage with and remove the food product 12 from the delivery tray 22 as well as to return printed food products to the delivery tray. A top surface of the receiving arm 20 is a receiving surface for food product and may be textured or otherwise provided with a surface to increase a co-efficient of friction between the receiving arm 20 and the food product for retaining the food product on the arm 20.

The receiving arm extends to receive or return the food product 12 and retracts from the tray 22 into the printer 14 and into a position below the print head 16 for printing. Once content is printed on a food product, the receiving arm 20 then extends to return the food product 12 back to the delivery tray 22. The delivery tray 22 then advances to provide a second unprinted food product 12 to the receiving arm 20. The receiving arm 20 is also configured for vertical movement such that the receiving surface of the receiving arm 20 is movable between two positions, a raised and a lowered position, where these positions allow the receiving arm 20 to retrieve and return food products 12 with respect to the delivery tray 22, and may allow for advancing of the delivery tray 22 when the receiving arm 20 is extended. Once loaded, the receiving arm 20 is then retracted to the printing position with the food product 12 thereon. This process continues on continuously and automatically per a pre-determined amount of food products are printed. It is also contemplated that the delivery tray may also be raised or lowered in order to allow for the delivery tray 22 to advance to a subsequent holder 26 or opening 28 on the delivery tray 22 for automatically delivering, receiving and thus printing on a plurality of food items.

Positioned adjacent or near the printing system is a base 40 for providing power and controlling advancement and vertical positioning of the delivery tray 22. The delivery tray 22 moves about an operable connection with a base 40. The delivery tray 22 may rotate or advance in a linear manner, or other directional movement which advances the delivery tray from one opening 26 to the next adjacent opening 28. In one non-limiting embodiment, as illustrated, the delivery tray 22 rotates about the operable connection with the base 40.

In embodiments where the printer system 10 is a hinged printed system 10 or otherwise configured for hingedly opening to the print area, the maintenance system 200 is positioned in a space 152 between a upper printer body 150 and a support base 160 of the printer system 10, but the maintenance system 200 may be supported on the upper print body 150 near the position of the carriage for the ink tanks when the printer is not in use or is in a standby mode for example. This area is generally adjacent to but spaced apart from the print area 18. As the support base 160 has dimensions that provide a height to the print area allowing the food products to be delivered from outside of the printer system 10 into the cavity 152 and below the print head 16 within the print area 18 in an unobstructed manner wherein the upper printer body 150 supports the print head there above. While, the upper printer body 152 supports many of the operational components of the printer system such as a print head and the gantry along which the print head is moveable, supports ink tank installations, and one or more of control and power components to the printer system, and optionally the ink maintenance system 200 described herein.

The maintenance tray 210 and maintenance catch tray 202 are removably connectable to the upper printer body 152 by way of clips, channels or other mating connectors which allow for securing the maintenance system catch tray 202 and channel 214 in the printer system 10 in a manner that is easily removable for cleaning. System 200 is positioned with an open end 240 of the catch tray 202 spaced apart from the channel 214 and filter 228 to be positioned for receiving an ink spray from the print head. That is, the open end of the tray 202 is positioned below a standby or maintenance location or position of the print head such that ink is ejected away from the print area. The filter 228 then collects ink mist or airborne ink particles not collected on the surfaces inside the catch tray 202 and in conjunction with the fan 224 the airborne particles are then caught in the filter and prevented from entering the printer system.

To remove ink from cleaning or changing the ink cartridges or other spent ink and clean the maintenance system 200 for further uses, the printer system 10 is opened about a hinged connection 170 to expose the cavity 152 for easy removal and replacement of the maintenance tray 210. The maintenance system 200 is also configured for disassembly for purposes of cleaning the individual components 202, 224 of the maintenance system 200 including cleaning or replacing the filter.

In the illustrated embodiments the food product is a dessert item such as a cookie. However, while examples of food items include various shapes, sizes, and types of cookies, the food items that can be printed with this system are not so limited. Frosting sheets, rice paper, bakery goods having at least one substantially flat surface for printing an image thereon, and other food items may be printed using this system. The delivery tray may be configured with positioning mechanisms which are tailored to the specific shape, size, thickness, type etc. of food product to be printed and thus, the system may be provided as a kit including the printer described herein including receiving arm and one or more delivery trays of various sizes, dimensions and for delivery of one or more different food products or food products having different dimensions.

The system is further configured with one or more control boards in communication with a computer or controller for configuring and initiating the printing process. However, the delivery tray is configured with one or more positioning mechanisms such that in combination with the receiving arm as a food product is delivered to the printer and positioned below the print head, the need for a sensing system or series of sensors for detecting the position of the food product is eliminated. A sensor may be utilizing in the printer for confirming the presence of the food product in the printer for printing. The sensors may be positioned on the print head and used to detect only the presence of the substrate for printing. The system is a fixed spot printing system so there is no need for scanning for position of the print surface. The system also allows for loading of unprinted food products and unloading of printed food products during printing or otherwise "on the fly." The control board or boards allow for the delivery of a first food product, printing of the first food product, return of the first food product, advancing of the delivery tray to provide a second food product for delivery, delivery of the second food product, printing of the second food product, return of the second food product to the delivery tray and advancing for delivery of one or more subsequent food products for printing and return. Thus, the system allows for the automatic delivery, printing on and return of a plurality of food products.

Although the present disclosure has been described with reference to preferred embodiments, workers skilled in the art will recognize that changes may be made in form and detail without departing from the spirit and scope of the disclosure.

The invention claimed is:

1. An ink maintenance system for a printer comprising:
   a first tray having a base and a plurality of side walls, the first tray having a first length and an open top along the length, the first tray positioned below a standby or cleaning position of a print head of the printer and configured to receive ink ejected from the print head;
   a filter; and
   a fan for directing air flow along a portion of and through the first length of the first tray; and
   wherein the ink maintenance system captures ink from the print head of the printer in at least one of the first tray and the filter, and wherein the ink maintenance system does so without the use of a foam component for receiving ink in the first tray and without the filter being positioned within the air flow path directed along the portion and through the first length of the first tray.

2. The system of claim 1 wherein the first tray is a catch tray for catching ink droplets from one or more nozzles operably connected to an ink cartridge.

3. The system of claim 1 wherein the fan is coupled to a second tray.

4. The system of claim 3 wherein the second tray is positioned on top of the first tray and covering at least a portion of the length of the open top of the first tray.

5. The system of claim 3 wherein the second tray houses the filter and the fan and wherein the second tray at least partially covers the open top of the first tray.

6. The system of claim 5 wherein the second tray has an open bottom such that an air flow is directed from a front of the first tray through the bottom of the second tray and into the filter therein.

7. The system of claim 5 wherein the first tray and second tray are removably coupled to one another to form an assembly for positioning within a printer.

8. The system of claim 1 wherein the filter is positioned within a second tray.

9. The system of claim 8 wherein the filter is removable from the second tray for cleaning or replacement of the filter.

10. An ink maintenance system incorporated into a printer system and wherein the incorporated system comprises:
    a printer having a print head and configured to receive an ink cartridge;
    a receiving arm supported by the printer and extendable and retractable across a path of the print head of the printer to sequentially deliver one of a plurality of food products to a position below the print head for printing; and
    an ink maintenance system positioned near a standby or cleaning position of the print head within the printer, the ink maintenance system comprising:
       a tray having a base and a plurality of side walls, the first try configured to receive ink from the print head during maintenance or cleaning of the print head;
       a fan for directing air flow through the first tray; and
       a filter.

11. The ink maintenance system of claim 10 and further comprising a filter holder supporting the filter and the fan coupled thereto, the filter holder positioned near the tray.

* * * * *